(12) United States Patent
Ushakov

(10) Patent No.: US 9,842,606 B2
(45) Date of Patent: Dec. 12, 2017

(54) ELECTRONIC DEVICE, METHOD OF CANCELLING ACOUSTIC ECHO THEREOF, AND NON-TRANSITORY COMPUTER READABLE MEDIUM

(71) Applicant: SAMSUNG ELECTRONICS CO., LTD., Suwon-si (KR)

(72) Inventor: Yury Ushakov, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/234,543

(22) Filed: Aug. 11, 2016

(65) Prior Publication Data

US 2017/0076710 A1 Mar. 16, 2017

(30) Foreign Application Priority Data

Sep. 15, 2015 (KR) ........................ 10-2015-0130130

(51) Int. Cl.
*G10K 11/16* (2006.01)
*G10L 21/0208* (2013.01)
(Continued)

(52) U.S. Cl.
CPC ........... *G10L 21/0208* (2013.01); *H04M 9/08* (2013.01); *G10K 11/002* (2013.01); *G10L 2021/02082* (2013.01)

(58) Field of Classification Search
CPC ....... G10L 21/0208; G10L 2021/02082; G10L 21/02; H04M 3/568; H04M 9/082;
(Continued)

(56) References Cited

U.S. PATENT DOCUMENTS 6,236,725 B1 5/2001 Takada et al.
6,570,986 B1 5/2003 Wu et al.
(Continued)

FOREIGN PATENT DOCUMENTS

JP 2007274714 A 10/2007
JP 2008252510 A 10/2008
(Continued)

OTHER PUBLICATIONS

Jacob Benesty et al., "A Better Understanding and an Improved Solution to the Specific Problems of Stereophonic Acoustic Echo Cancellation", IEEE Transactions on Speech and Audio Processing, vol. 6, No. 2, Mar. 1998, pp. 156-165.
(Continued)

*Primary Examiner* — Andrew L Sniezek
(74) *Attorney, Agent, or Firm* — Sughrue Mion, PLLC

(57) ABSTRACT

An electronic device, a method of cancelling an echo signal thereof, and a non-transitory computer readable recording medium are provided. The electronic device includes a speaker configured to output a sound corresponding to a first audio signal, a microphone configured to acquire a surrounding sound of the electronic device to generate a second audio signal; a double-talk detector (DTD) configured to determine whether a double-talk state, in which an echo signal and a noise signal of the first audio signal are included in the second audio signal, occurs; and an acoustic echo canceller (AEC) configured to generate an estimated echo signal corresponding to the echo signal of the first audio signal based on an adaptive filter (AF) in response to the DTD determining that the double-talk state does not occur and cancel the generated estimated echo signal from the second audio signal to detect an error signal.

11 Claims, 11 Drawing Sheets

(51) Int. Cl.
*H04M 9/08* (2006.01)
*G10K 11/00* (2006.01)

(58) Field of Classification Search
CPC ............ H04M 3/23; H04M 9/08; H04B 3/20; G10K 11/002; G10K 11/16
See application file for complete search history.

(56) References Cited

U.S. PATENT DOCUMENTS

| | | | |
|---|---|---|---|
| 6,944,288 | B2 | 9/2005 | Seibert |
| 7,003,101 | B2* | 2/2006 | Seibert .................. H04B 3/23 379/406.01 |
| 7,352,858 | B2 | 4/2008 | Stokes et al. |
| 7,471,788 | B2 | 12/2008 | Bist et al. |
| 7,787,613 | B2 | 8/2010 | Cruz-Zeno et al. |
| 8,184,818 | B2 | 5/2012 | Ishiguro |
| 8,260,613 | B2 | 9/2012 | Trump |
| 8,498,407 | B2 | 7/2013 | Mohammad et al. |
| 8,498,423 | B2 | 7/2013 | Thaden et al. |
| 8,737,601 | B2 | 5/2014 | Fadili et al. |
| 8,761,386 | B2 | 6/2014 | Fujita et al. |
| 8,767,951 | B2 | 7/2014 | Sekine et al. |
| 2004/0071284 | A1* | 4/2004 | Abutalebi ............ G10L 21/0208 379/406.08 |
| 2004/0151303 | A1 | 8/2004 | Park et al. |
| 2005/0243995 | A1 | 11/2005 | Kang et al. |
| 2007/0121925 | A1 | 5/2007 | Cruz-Zeno et al. |
| 2007/0121926 | A1 | 5/2007 | Le Gall et al. |
| 2008/0075270 | A1 | 3/2008 | Kamiya |
| 2008/0298601 | A1 | 12/2008 | Rahbar |
| 2009/0059821 | A1 | 3/2009 | Wu et al. |
| 2009/0103743 | A1 | 4/2009 | Honda |
| 2010/0135483 | A1 | 6/2010 | Mohammad et al. |
| 2011/0255703 | A1 | 10/2011 | Jansse et al. |
| 2013/0268267 | A1 | 10/2013 | Hwang et al. |
| 2014/0112488 | A1 | 4/2014 | Kim et al. |
| 2014/0247949 | A1* | 9/2014 | Sugiyama ............ H04M 9/082 381/71.1 |
| 2015/0133097 | A1 | 5/2015 | Jang |
| 2015/0133098 | A1 | 5/2015 | Warr |

FOREIGN PATENT DOCUMENTS

| | | |
|---|---|---|
| JP | 2009105620 A | 5/2009 |
| JP | 2009124386 A | 6/2009 |
| JP | 2009284465 A | 12/2009 |
| JP | 2013187810 A | 9/2013 |
| KR | 1999006701 A | 1/1999 |
| KR | 1020040044217 A | 5/2004 |
| KR | 1020080072056 A | 8/2008 |
| KR | 101357381 B1 | 2/2014 |
| KR | 1020140051777 A | 5/2014 |
| KR | 1020150012752 A | 2/2015 |
| KR | 1020150053621 A | 5/2015 |

OTHER PUBLICATIONS

Jacob Benesty et al., "A New Class of Doubletalk Detectors Based on Cross-Correlation", IEEE Transactions on Speech and Audio Processing, vol. 8, No. 2, Mar. 2000, pp. 168-172.

Hun Choi & Hyeon-Deok Bae, "Subband Affine Projection Algorithm for Acoustic Echo Cancellation System", Hindawi Publishing Corporation, EURASIP Journal on Advances in Signal Processing, vol. 2007, Article ID 75621, doi:10.1155/2007/75621, Total 12 pages.

Israel Cohen, "Noise Estimation by Minima Controlled Recursive Averaging for Robust Speech Enhancement", IEEE Signal Processing Letters, vol. 9, No. 1, Jan. 2002, pp. 12-15.

P. P. Vaidyanathan, "Multirate Digital Filters, Filter Banks, Polyphase Networks, and Applications: A Tutorial", Proceedings of the IEEE, vol. 78, No. 1, Jan. 1990, pp. 56-93.

Ted S. Wada & Biing-Hwang Juang, "Enhancement of Residual Echo for Robust Acoustic Echo Cancellation", IEEE Transactions on Audio, Speech, and Language Processing, vol. 20, No. 1, Jan. 2012, pp. 175-189.

Ted S. Wada & Biing-Hwang (Fred) Juang, "Acoustic Echo Cancellation Based on Independent Component Analysis and Integrated Residual Echo Enhancement", 2009 IEEE Workshop on Applications of Signal Processing to Audio and Acoustics, Oct. 18-21, 2009, New Paltz, NY, pp. 205-208.

* cited by examiner two-state DTD multi-state DTD

ELECTRONIC DEVICE, METHOD OF CANCELLING ACOUSTIC ECHO THEREOF, AND NON-TRANSITORY COMPUTER READABLE MEDIUM

CROSS-REFERENCE TO RELATED APPLICATION

This application claims priority from Korean Patent Application No. 10-2015-0130130, filed on Sep. 15, 2015 in the Korean Intellectual Property Office, the disclosure of which is incorporated herein by reference in its entirety.

BACKGROUND

Field

Apparatuses and methods consistent with exemplary embodiments relate to cancelling an acoustic echo, and more particularly to minimizing an effect on a filter adapting process for cancelling an acoustic echo by precisely sensing a double-talk state.

Description of the Related Art

In an electronic device such as a communication terminal, a voice of a far-end speaker may be echoed by a surrounding environment and then input through a nearby speaker. The sound of the voice reverberating in the electronic device may be referred to as an acoustic echo.

A recent display apparatus such as a smart television (TV) frequently includes a microphone to perform a voice recognition function. Therefore, there are demands for a method of cancelling an acoustic echo that may be used in various types of electronic devices including a communication terminal.

A related-art acoustic echo canceller as shown in FIG. 1 is used to cancel an acoustic echo as described above. A far-end speaker signal $x(n)$ output through a speaker becomes an echo signal $h(n)*x(n)$ through a surrounding environment and then input into a near-end microphone. An adaptive filter cancels $\hat{h}(n)*x(n)$ from a signal $d(n)$ input into the microphone by estimating an estimation value $\hat{h}(n)$ of $h(n)$ corresponding to an acoustic echo path. Therefore, the related-art acoustic echo canceller reduces an effect by the far-end speaker signal.

A problem of this method is a double-talk state where an echo signal $h(n)*x(n)$ of the far-end speaker signal and a signal $s(n)$ of a near-end speaker are simultaneously input. If the estimation value $\hat{h}(n)$ is determined to cancel a near-end signal together from the adaptive filter, a real acoustic echo path is not reflected.

In order to address this double-talk problem in the related technology, a method of finding an algorithm robust to a double-talk state is examined. However, if the method is applied to a real product, a satisfactory effect is not acquired.

Also, in the related technology, if the double-talk state is sensed by using a cross-correlation between the output signal $x(n)$ of the far-end speaker and the input signal $d(n)$ of the near-end speaker, a method of stopping an operation of the adaptive filter is provided. However, there is a problem where many computing resources for a cross-correlation computation are consumed. Also, there is a problem where completely stopping the operation of the adaptive filter is not efficient.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an electronic device that controls an updating speed of an adaptive filter (AF) by estimating an echo by using variance values of error signals of a plurality of sub-bands and dividing the variance values of the error signal into a plurality of states, a method of cancelling an acoustic echo thereof, and a non-transitory computer readable recording medium.

According to an aspect of an exemplary embodiment, there is provided an electronic device including: a speaker configured to output a sound corresponding to a first audio signal, a microphone configured to generate a second audio signal by acquiring a surrounding sound of the electronic device, a double-talk detector (DTD) configured to determine a double-talk state where an echo signal and a noise signal of the first audio signal are simultaneously included in the second audio signal, and an acoustic echo canceller (AEC) configured to generate an estimated echo signal corresponding to the echo signal of the first audio signal by using an adaptive filter (AF) in response to the double-talk state not being determined and detect an error signal by cancelling the generated estimated echo signal from the second audio signal. The DTD may determine the double-talk state by using a variance value of the error signal and changes an updating speed of the AF in response to the double-talk state being determined, and the AEC may generate an estimated echo signal tracking the echo signal of the first audio signal by using the variance value of the error signal.

According to an aspect of another exemplary embodiment, there is provided a method of cancelling an echo signal of an electronic device, including: generating a second audio signal by acquiring a surrounding sound of the electronic device, determining a double-talk state where an echo signal and a noise signal of a first audio signal output from the electronic device are simultaneously included in the second audio signal, generating an estimated echo signal corresponding to the echo signal of the first audio signal by using an AF in response to the double-talk state not being determined, and detecting an error signal by cancelling the generated estimated echo signal from the second audio signal. The determining may include determining the double-talk state by using the variance value of the error signal and, in response to the double-talk state being determined, changing an updating speed of the AF, and the generating of the estimated echo signal may include generating an estimated echo signal tracking the echo signal of the first audio signal by using the variance value of the error signal.

According to an aspect of another exemplary embodiment, there is provided a non-transitory computer readable recording medium including a program for executing a method of cancelling an echo signal of an electronic device. The method may include generating a second audio signal by acquiring a surrounding sound of the electronic device, determining a double-talk state where an echo signal and a noise signal of a first audio signal output from the electronic device are simultaneously included in the second audio signal, generating an estimated echo signal corresponding to the echo signal of the first audio signal by using an AF in response to the double-talk not being determined, and detecting an error signal by cancelling the generated estimated echo signal from the second audio signal. The determining may include determining the double-talk state by using the variance value of the error signal and changing an update speed of the AF in response to the double-talk being determined, and the generating of the estimated echo signal may include generating an estimated echo signal tracking the echo signal of the first audio signal by using the variance value of the error signal.

According to various exemplary embodiments, a method of further simply and precisely determining a double-talk state may be provided. Also, an echo estimation algorithm having an improved precision in comparison with an existing algorithm may be provided.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
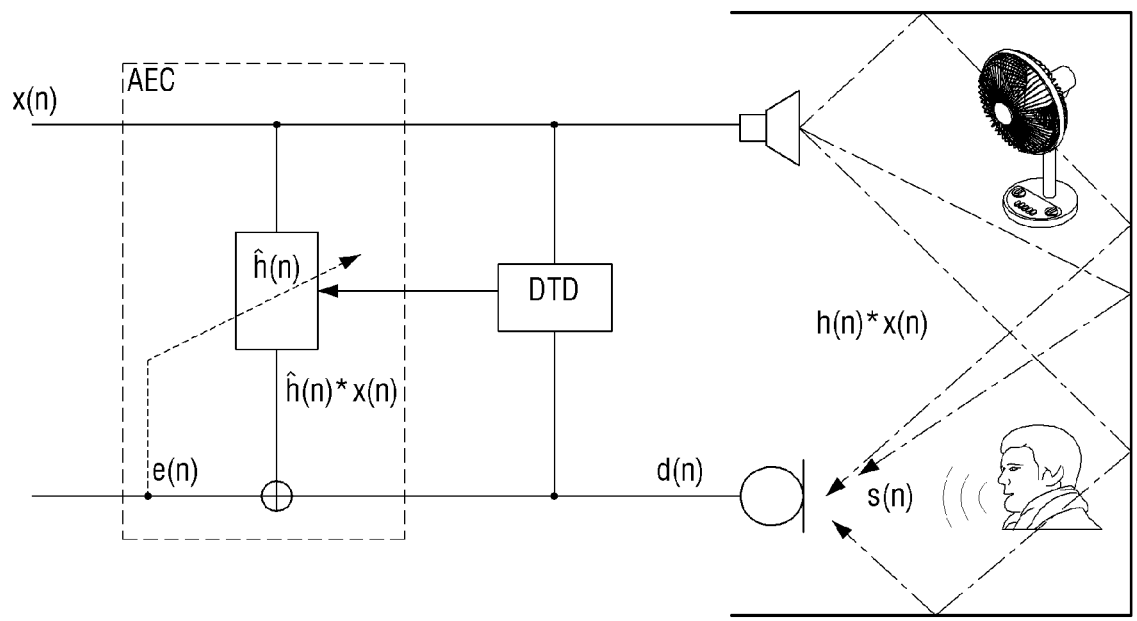
FIG. 1 illustrates a related-art acoustic echo canceller including a double-talk detector.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the terms "first", "second", etc., may modify various types of elements regardless of orders, but these elements are not restricted by the terms. The terms may be used to distinguish one element from another. For example, without departing from the scope of the present disclosure, a first element may be referred to as a second element, and similarly, the second element may also be referred to as the first element. As used herein, the term "and/or" includes any and all combinations of one or more of the associated listed items.

The terminology used herein is for the purpose of describing exemplary embodiments merely and is not intended to be limiting and/or restricting of exemplary embodiments. As used herein, the singular forms are intended to include the plural forms as well, unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

Figure 2:
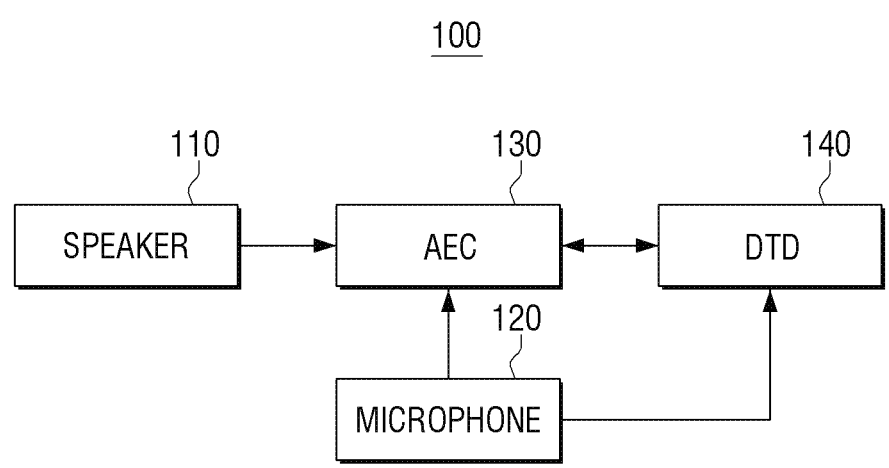
FIG. 2 is a block diagram of a schematic configuration of an electronic device, according to an exemplary embodiment.

FIG. 2 is a block diagram of a schematic configuration of an electronic device 100, according to an exemplary embodiment. Referring to FIG. 2, the electronic device 100 may include a speaker 110, a microphone 120, an acoustic echo canceller (AEC) 130, and a double-talk detector (DTD) 140.

The electronic device 100 according to the present exemplary embodiment may be realized as all types of electronic devices capable of inputting and/or outputting a voice, like a display apparatus such as a smart TV, a smartphone, a tablet PC, an audio device, an interactive voice recognition device, a navigation system, or the like.

The speaker 110 may output a sound. For example, the speaker 110 may output a sound by processing an audio signal.

The microphone 120 may acquire a surrounding sound of the electronic device 100. The microphone 120 may also generate an audio signal by processing the acquired sound.

The AEC 130 may cancel an acoustic echo signal of a signal output from the speaker 110 by using an adaptive filter (AF) 131.

For example, the AEC 130 may generate an estimated echo signal tracking the signal output from the speaker 110 by updating an AF coefficient. The AEC 130 may eliminate noise caused by a voice signal of the electronic device 100 by cancelling the estimated echo signal generated from the signal acquired by the microphone 120.

According to an exemplary embodiment, the AEC 130 may generate an estimated echo signal by using a variance value of an error signal. The AEC 130 may consecutively update the estimated echo signal so as to track an echo signal of the signal output from the speaker 110. The error signal refers to a value acquired by cancelling an estimated echo signal estimated in a previous stage from an input signal. For example, if the tracking is perfect, the estimated echo signal may correspond to a real echo signal of the signal output from the speaker 110. In this case, the error signal may be 0.

The DTD 140 may determine a double-talk state from a signal received from the microphone 120. The double-talk state refers to a state where the echo signal and a noise signal of the signal output from the speaker 110 are simultaneously input. The double-talk state may mainly become a problem if a noise signal caused by a near-end speaker near to the microphone 120 is input simultaneously with the echo signal.

According to an exemplary embodiment, the DTD 140 may determine the double-talk state based on the variance value of the error signal. Also, if the double-talk state is determined, the DTD 140 may change an updating speed of the AF 131 of the AEC 130.

Figure 3:
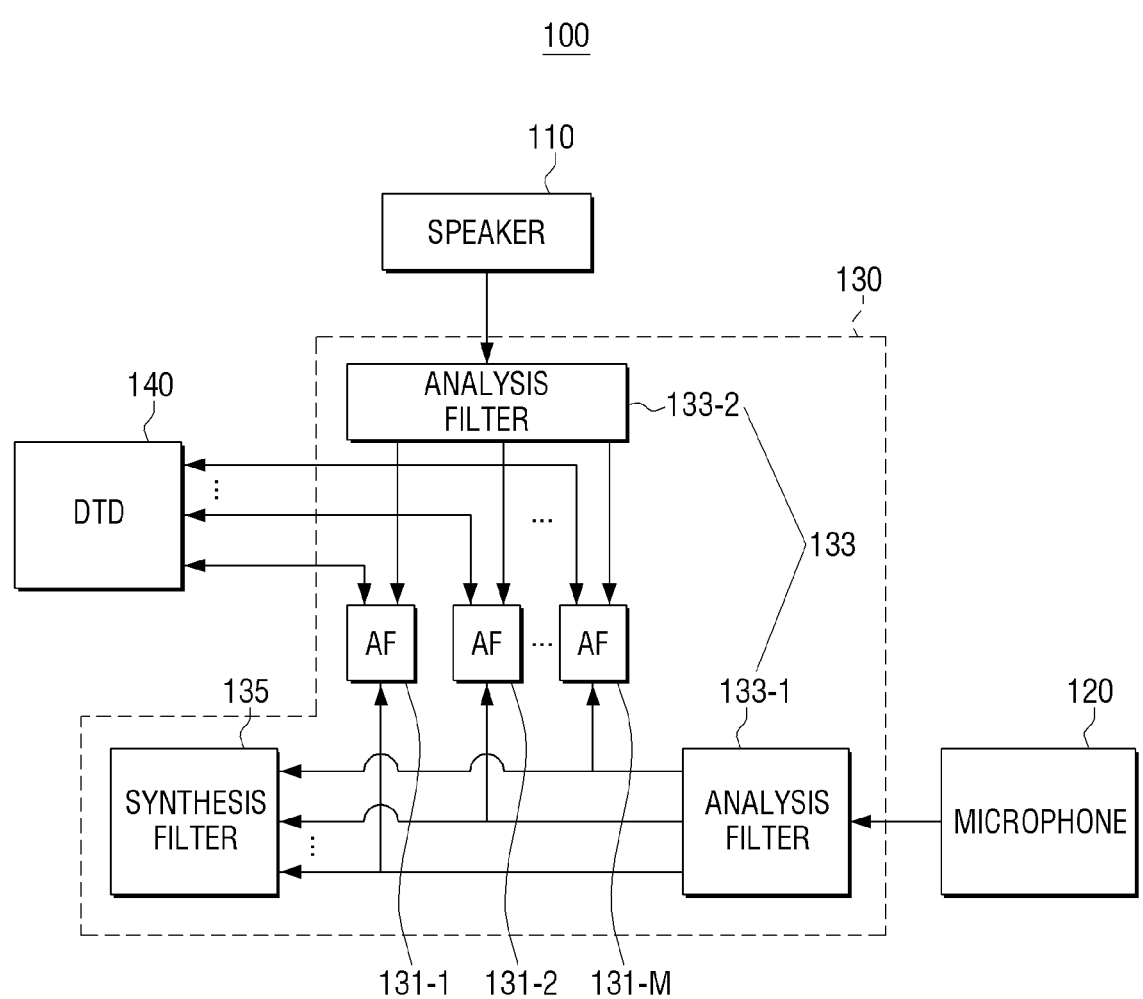
FIG. 3 is a block diagram of a detailed configuration of an electronic device, according to an exemplary embodiment.

FIG. 3 is a block diagram of a detailed configuration of the electronic device 100, according to an exemplary embodiment. Referring to FIG. 3, the electronic device 100 may include the speaker 110, the microphone 120, the AEC 130, and the DTD 140. Also, the AEC 130 may include a plurality of AFs 131-1, 131-2, . . . , and 131-M, an analysis filter 133, and a synthesis filter 135.

Descriptions of the speaker 110 and the microphone 120 of FIG. 3 are the same as those of the speaker 110 and the microphone 120 of FIG. 2 and thus are omitted. Operations of the AEC 130 and the DTD 140 will now be described in more detail.

The analysis filter 133 performs an operation of dividing an audio signal into a plurality of frequency bands. For example, an analysis filter 133-1 may divide a signal received from the microphone 120. Also, an analysis filter 133-2 may divide a signal output from the speaker 110.

The synthesis filter 135 performs an operation of synthesizing the signal divided into the plurality of frequency bands. For example, the synthesis filter 135 may receive other signals, from which estimated echo signals are respectively cancelled, from the plurality of AFs 131-1, 131-2, . . . , and 131-M and then synthesize the other signals. A result synthesized by the synthesis filter 135 is a residual echo signal.

According to an exemplary embodiment, the AEC 130 may include the plurality of AFs 131-1, 131-2, . . . , and 131-M that operate in different frequency bands. The plurality of AFs 131-1, 131-2, . . . , and 131-M may respectively generate estimated echo signals having allocated frequency bands. The divided frequency bands may be referred to as sub-bands. Also, the AEC 130 that uses the above-described method is also referred to as a sub-band AEC.

According to an exemplary embodiment, the plurality of AFs 131-1, 131-2, . . . , and 131-M may respectively detect error signals of the allocated frequency bands. Also, the plurality of AFs 131-1, 131-2, . . . , and 131-M may calculate variance values of the detected error signals.

One of the plurality of AFs 131-1, 131-2, . . . , and 131-M according to an exemplary embodiment generates an estimated echo signal of a frequency band allocated thereto by using variance values of error signals detected by the other AFs 131-2, 131-3, . . . , and 131-M operating in different frequency bands (i.e., different sub-bands) and the error signal detected by the one AF. This characteristic of the AEC 130 according to an exemplary embodiment is merely to divide and process frequency bands, and thus the AEC 130 has a difference from a sub-band AEC.

For example, the AF 131-1 of the lowest frequency band among the plurality of AFs 131-1, 131-2, . . . , and 131-M detects an error signal of the allocated lowest frequency band. Also, the AF 131-1 of the lowest frequency band may update the estimated echo signal of the lowest frequency band by using a variance value of a right previous error signal detected by the another AF 131-M operating in the highest frequency band along with the error signal detected by the another AF 131-M.

The AEC 130 according to an exemplary embodiment may use an error signal in a whole sub-band when updating the estimated echo signal of each sub-band. For example, the AEC 130 may generate an estimated echo signal by using an averaged error variance value. The term "averaged" is used herein but does not refer to a generally used arithmetical average. The "averaged error variance" used herein means that a variance value of an error signal detected by the AF 131-1 of one sub-band and variance values of error signals detected by the other AFs 131-2, 131-3, . . . , and 131-M of other sub-bands are all considered. A detailed equation of this will be described later with reference to FIG. 4.

The DTD 140 according to an exemplary embodiment may determine a double-talk state by comparing a variance value of an error signal with a preset threshold value. For example, the DTD 140 may set a plurality of threshold values. The DTD 140 having the plurality of threshold values may also be referred to as a multi-state DTD.

The DTD 140 according to an exemplary embodiment may determine several stage states by comparing the variance value of the error signal with the plurality of threshold values. For example, the DTD 140 may divide the variance value into a plurality of sections according to the plurality of threshold values and then determine a section where the variance value of the error signal is located. Also, the DTD 140 may change an updating speed of the AF 131 by determining a parameter corresponding to the section of the plurality of sections where the variance value of the error signal is located.

The plurality of threshold values are set to distinguish the double-talk state from a state where a path of an echo signal is changed (e.g., a state where a person goes by in front of a TV). For example, if the variance value of the error signal is greater than most of the plurality of threshold values, the DTD 140 may determine that there is a high possibility of the double-talk state. The DTD 140 may also reduce an updating speed of an AF according to which one of the plurality of sections the variance value of the error signal is located in.

On the contrary to this, if the variance value of the error signal is less than most of the plurality of threshold values, the DTD 140 may determine that the error signal is generated according to a change in a path of an echo signal. Also, the DTD 140 may maintain the updating speed of the AF.

A more detailed determination method will be described later with reference to FIGS. 5 and 6.

Figure 4:
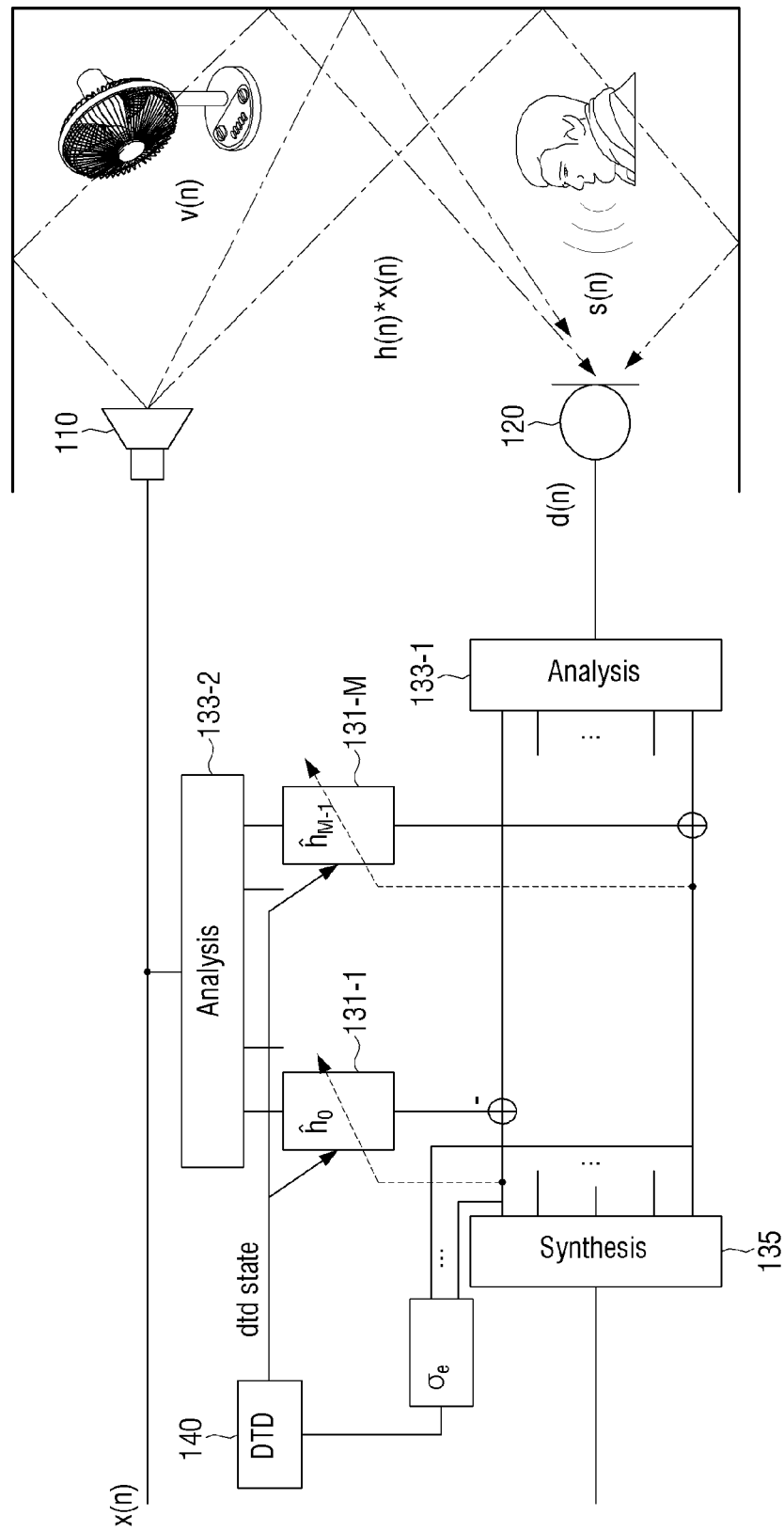
FIG. 4 illustrates an operation of an electronic device, according to an exemplary embodiment.

FIG. 4 illustrates an operation of the electronic device 100, according to an exemplary embodiment.

A reference signal x(n) is output through the speaker 110. The output reference signal x(n) may be input as an echo signal h(n)*x(n) into the microphone 120 by an acoustic echo path h(n). The echo signal h(n)*x(n) may be calculated as convolutions of the acoustic echo path h(n) and the reference signal x(n). Alternatively, the echo signal h(n)*x(n) may be expressed as $h^T(n)x(n)$ by using a transposed value of the acoustic echo path h(n).

Also, a noise signal v(n) generated by a surrounding object and a noise signal s(n) generated by a near-end speaker may be input into the microphone 120. If a double-talk state becomes a problem, the noise signal v(n) generated by the surrounding object hardly affects the double-talk state, and the noise signal s(n) generated by the near-end speaker mainly becomes a problem. Here, the noise signal s(n) generated by the near-end speaker is expressed as noise but may be a voice command of a user for controlling the electronic device 100. The voice command of the user may be evaluated as noise when cancelling the echo signal and thus is expressed as the noise signal. Therefore, a signal input into the electronic device 100 through the microphone 120 is d(n) and may be expressed as in Equation 1.

$$d(n)=h(n)x(n)+s(n)+v(n) \quad (1)$$

The AF 131 may generate an estimated echo signal $\hat{h}(n)x(n)$. Also, the AF 131 may cancel the estimated echo signal $\hat{h}(n)x(n)$ from the input signal d(n). An error signal e(n) becomes a signal that is acquired by cancelling the estimated echo signal from the input signal.

$$e(n)=d(n)-\hat{h}(n)x(n) \quad (2)$$

The AEC 131 according to an exemplary embodiment may include a plurality of AFs 131, an analysis filter 133, and a synthesis filter 135. An analysis filter 133-1 divides the input signal d(n) according to frequency bands. For example, as shown in FIG. 4, if M AFs 131-1, 131-2, ..., and 131-M exist, the analysis filter 133-1 divides the input signal d(n) into M bands. Divided frequency bands may be expressed as sub-bands.

The plurality of AFs 131 according to an exemplary embodiment respectively cancels an estimated echo signal from an input signal of an allocated frequency band. Therefore, the plurality of AFs 131 may respectively detect error signals of allocated frequency bands. The plurality of AFs 131 may update an estimated filter coefficient ĥ(n) by using the detected error signals. For example, the AF 131 may generate an estimated echo signal through an updated filter coefficient as in Equation 3 below:

$$\hat{h}_b(n+1) = \hat{h}_b(n) + \mu_b e_b(n) \frac{x_b(n)\|x_b(n)\|^2}{\|x_b(n)\|^4 + \gamma \sigma_{e_n}^4} \quad (3)$$

wherein b denotes an index of a sub-band. For example, if an input signal is divided into M sub-bands as shown in FIG. 4, b=0, ..., M-1.

Also, n denotes a discrete time instance, and µ denotes a parameter controlling an updating speed of the AF 131.

As in Equation 3, the plurality of AFs 131-1, 131-2, ..., and 131-M independently update filter coefficients. However, variance values of error signals used for updating the filter coefficients are not error signal variance values of independent sub-bands. The AEC 130 according to an exemplary embodiment may use an averaged error variance value smoothed for a whole band instead of using error variances of independent sub-bands in order to increase a robustness to a double talk. An averaged error variance value $\sigma_{e_n}$ may be determined as in Equation 4 below.

$$\begin{cases} \sigma_n(0) = \alpha \sigma_{n-1}(M-1) + (1-\alpha)\sigma_{e_n}(0) \\ \sigma_n(b) = \alpha \sigma_n(b-1) + (1-\alpha)\sigma_{e_n}(b) \end{cases} \quad (4)$$

An expression described in Equation 4 above is an expression of the AF 131-1 of the lowest frequency band among the plurality of AFs 131. Also, an expression described below is an expression of the other AFs 131-2, ..., and 131-M. α is a smoothing parameter.

For example, the AF 131-1 of the lowest frequency band among the plurality of AFs 131-1, 131-2, ..., and 131-M may derive an averaged error variance value by using a variance value $\sigma_{e_n}(0)$ of an error signal of an allocated sub-band and an averaged error variance value $\sigma_{n-1}(M-1)$ detected from the AF 131-M operating in the highest band in a previous stage. The derived averaged error variance value may be substituted into Equation 3 above to be used so as to acquire an adaptive coefficient.

As another example, an AF 131-b of a b+1$^{th}$ frequency band among a plurality of AFs may derive an averaged error variance value by using a variance value $\sigma_{e_n}(b)$ of an error signal of an allocated sub-band and an averaged error variance value $\sigma_n(b-1)$ of an AF 131-b-1 of an adjacent lower band (i.e., a b$^{th}$ band).

Through this process, if an increase in an error variance value caused by a double-talk is detected in a low frequency band, the double-talk may be checked in a high frequency band and may be spread to the highest frequency band.

For example, if a frequency band is divided into three sub-bands, an averaged error variance of each of the three sub-bands may be expressed as in Equation 5 below.

$$\sigma_n(0) = \alpha \sigma_{n-1}(2) + (1-\alpha)\sigma_{e_n}(0) \quad (5)$$

$$\sigma_n(1) = \alpha \sigma_n(0) + (1-\alpha)\sigma_{e_n}(1)$$
$$= \alpha^2 \sigma_{n-1}(2) + (1-\alpha)(\alpha \sigma_{e_n}(0) + \sigma_{e_n}(1))$$

$$\sigma_n(2) = \alpha \sigma_n(1) + (1-\alpha)\sigma_{e_n}(2)$$
$$= \alpha^3 \sigma_{n-1}(2) + (1-\alpha)(\alpha^2 \sigma_{e_n}(0) + \alpha \sigma_{e_n}(1) + \sigma_{e_n}(2))$$

As shown in Equation 5 above, variance values of error signals detected in all sub-bands are reflected on an averaged error variance derived from each sub-band.

As described above, the AEC 130 according to an exemplary embodiment may increase an adaptive speed and prevent a divergence of a filter by using a variance value of an error signal.

The DTD 140 according to an exemplary embodiment may determine a double-talk state by merely examining an averaged error signal variance value. Therefore, the DTD 140 may determine the double-talk state without using a cross-correlation requiring many resources and a lot of time for computations.

Figure 5:
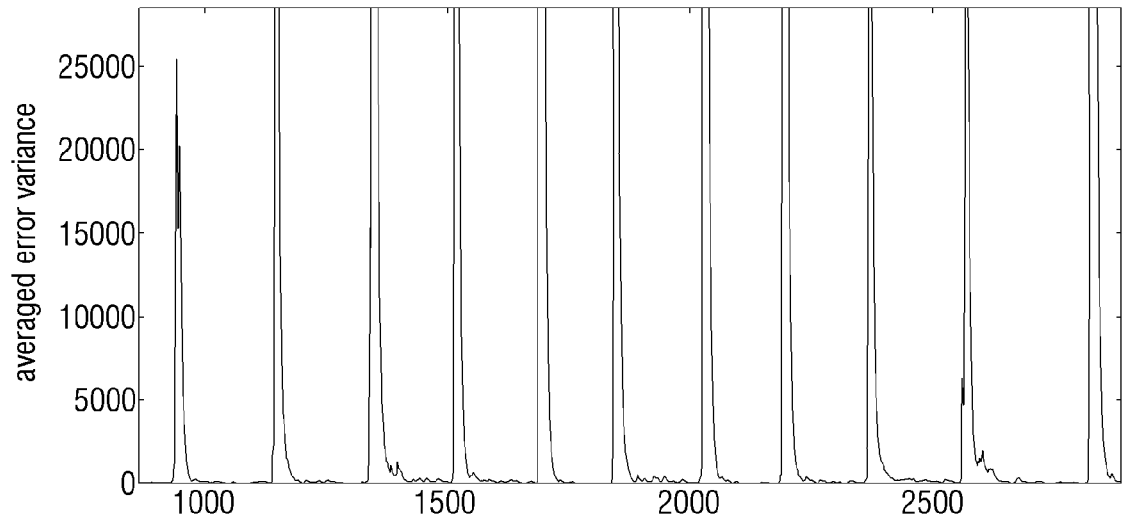
FIG. 5 is a graph illustrating a variance value of an averaged error signal detected by an electronic device, according to an exemplary embodiment.

If the averaged error variance value is illustrated with time, a graph as shown in FIG. 5 may be acquired. Parts expressed as peaks on the graph correspond to parts where double-talk occurs. Therefore, the DTD 140 may set a threshold value and, if an error variance exceeding the set threshold value occurs, determine that double-talk occurs.

However, if double-talk is determined based on one threshold value as described in a related technology (i.e., in case of a two-state DTD), a determination may not be made as to whether double-talk occurs or a momentary echo path is changed.

On the contrary to this, the DTD 140 according to an exemplary embodiment may determine double-talk (i.e., a multi-state DTD) based on a plurality of threshold values. The DTD 140 may set a threshold value of a lowest level by tracking a noise floor of an averaged error variance. For example, a threshold value $T_1$ of a lowest level may be determined by multiplying an estimated floor level $\sigma_n^{floor}$ by a particular coefficient $c_1$.

$$T_1 = c_1 \sigma_n^{floor} \quad (6)$$

Also, threshold values of next levels may be determined from the threshold value of the lowest level. For example, the threshold values may be determined as a value acquired by multiplying the threshold value of a previous level by a particular coefficient. For example, if a plurality of threshold values are set in S stages, the DTD 140 may set a threshold value as in Equation 7 below.

$$T_i = c_i T_{i-1}, i=2, \ldots, S$$

$$1 < c_i \leq 2 \quad (7)$$

Figure 6:
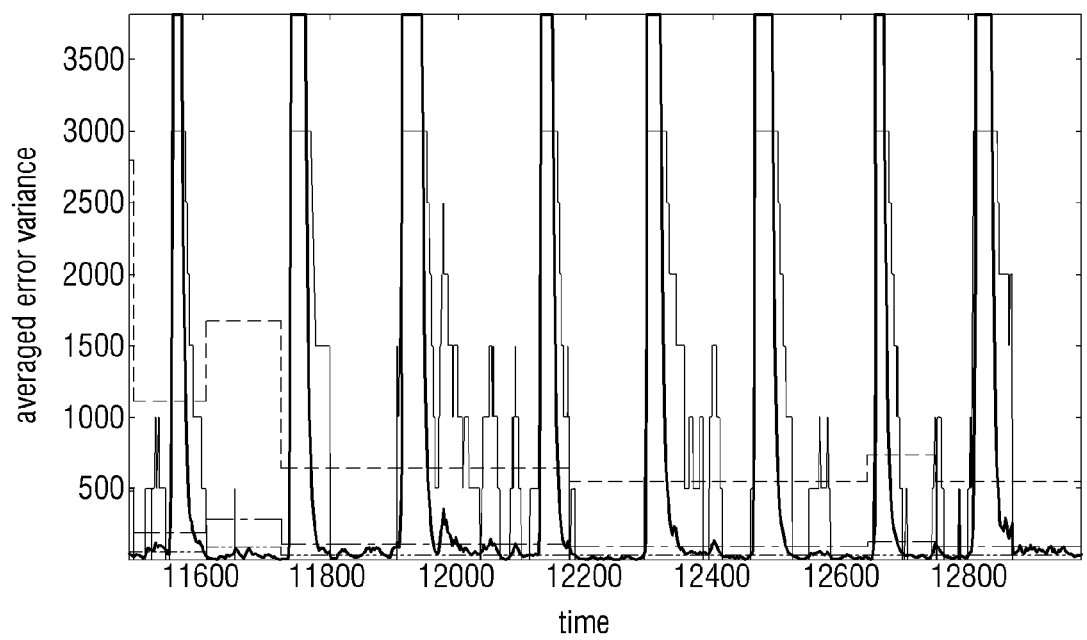
FIG. 6 is a graph illustrating a determination of a double-talk state based on a plurality of threshold values in an electronic device, according to an exemplary embodiment.

Referring to FIG. 6, a two-dot chain line illustrated in a lowest location corresponds to the threshold value $T_1$ of the lowest level. Also, a one-dot chain line illustrated in a second location and a dotted line illustrated in a third location respectively denote $T_3$ and $T_6$. As shown in FIG. 6, the DTD 140 may set the threshold value of the lowest level by tracking the noise floor of the averaged error variance. Therefore, a plurality of threshold values may be changed with time.

The DTD 140 according to an exemplary embodiment may determine which one of a plurality of sections the averaged error variance value is located in by comparing the plurality of set threshold values and the averaged error variance value. Also, the DTD 140 may determine a DTD state according to the determined section. The DTD 140 may control an updating speed of the AF 131 by changing the parameter µ of Equation 3 according to the determined DTD state.

For example, the DTD 140 may control the updating speed according to DTD state S as in Equation 8 below. S_dtd in Equation 8 may be determined by an experiment.

$$\begin{cases} \mu, & \text{if } S \leq S_{dtd} \\ \mu/2^{S-S_{dtd}}, & \text{otherwirse} \end{cases} \qquad (8)$$

Figure 7A:
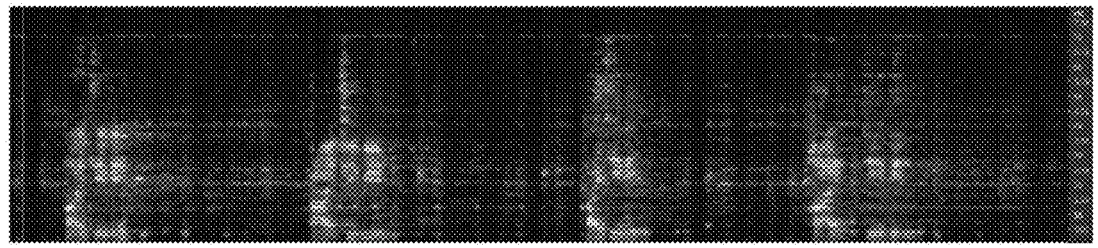
FIGS. 7A through 7C are graphs illustrating a comparison between an effect of an electronic device according to an exemplary embodiment and an effect of a related technology.
Figure 7B:
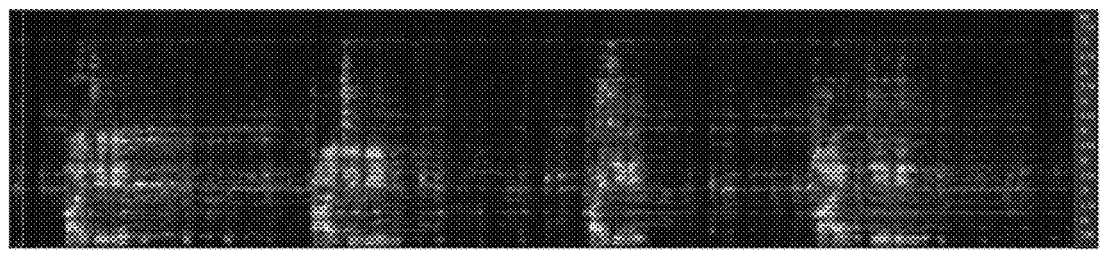
Figure 7C:
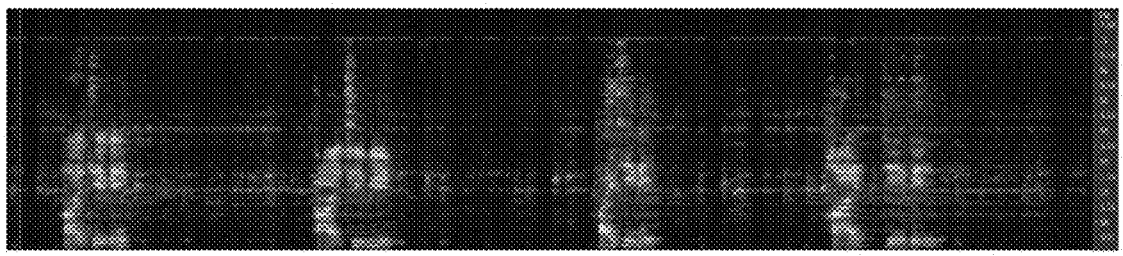

FIGS. 7A through 7C are graphs illustrating a comparison between an effect of the electronic device 100 according to an exemplary embodiment and an effect of a related technology. FIGS. 7A through 7C are spectrograms of error signals.

FIG. 7A corresponds to a case where a DTD is not used. As shown in FIG. 7A, a signal generated by a sound such as a reverberation appears. Even in a case of a related-art DTD as shown in FIG. 7B, an AF rapidly diverges, and thus a reverberation signal as shown in FIG. 7B is frequently observed.

On the contrary to this, if the multi-state DTD 140 according to an exemplary embodiment shown in FIG. 7C is used, a divergence of the AF 131 may not be prevented, and thus a signal as described above is not observed.

The electronic device 100 according to various exemplary embodiments as described above may cancel an acoustic echo so as to be more robust to a double-talk state by using error signal variance values of all sub-bands. Also, the electronic device 100 may determine a double-talk state by setting a plurality of threshold values so as to increase a reliability of the determination of the double-talk state of the electronic device 100 of a user. Also, instead of completely stopping an operation of an AF, an effect of the AF that adapts at an appropriate speed may be acquired.

Methods of cancelling an echo signal of the electronic device 100 according to various exemplary embodiments will now be described with reference to FIGS. 8 and 9.

Figure 8:
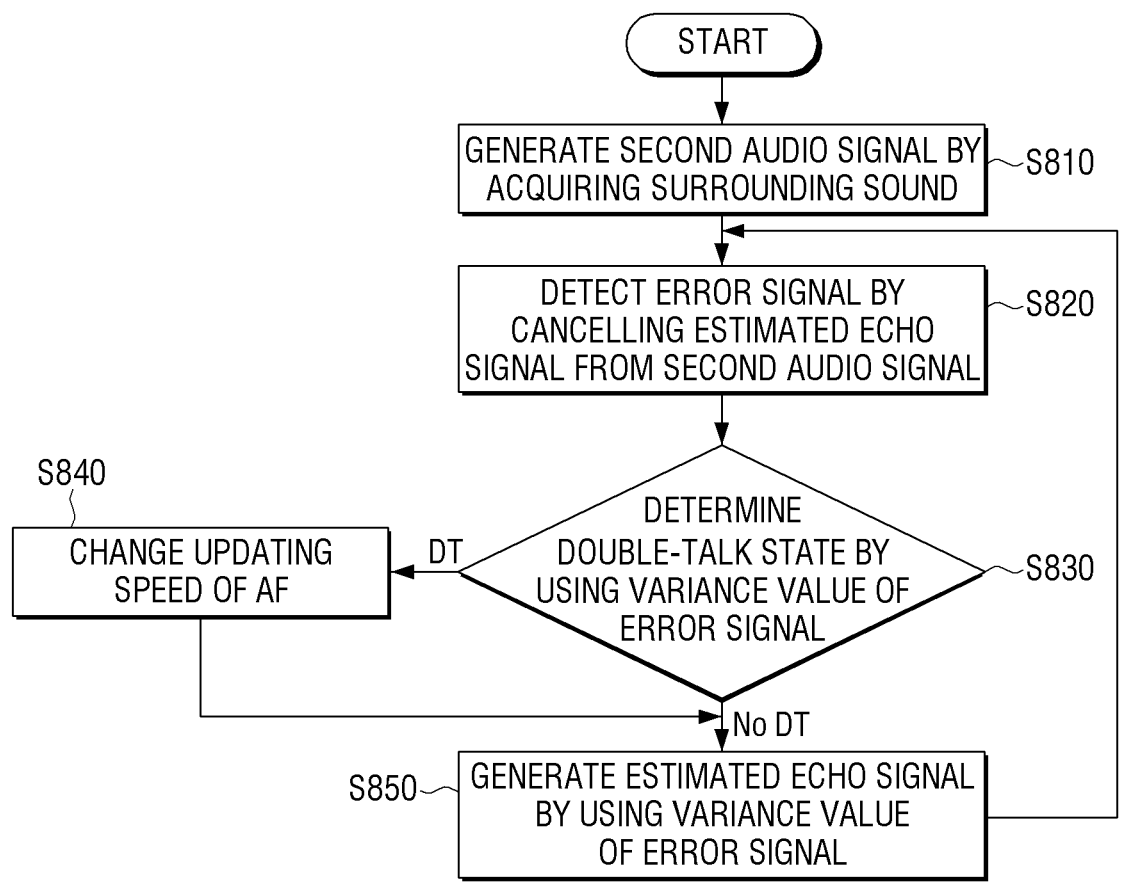
FIGS. 8 and 9 are flowcharts of a method of cancelling an acoustic echo signal of an electronic device, according to various exemplary embodiments.

FIG. 8 is a flowchart of a method of cancelling an echo signal of the electronic device 100, according to an exemplary embodiment. Referring to FIG. 8, in operation S810, the electronic device 100 may generate a second audio signal by acquiring a surrounding sound. The second audio signal may be a mixture of an echo signal of a signal output from the electronic device 100 and other noise signals. The electronic device 100 may receive the second audio signal through a microphone or the like.

In operation S820, the electronic device 100 may detect an error signal by cancelling an estimated echo signal from the second audio signal. The electronic device 100 may cancel an echo signal of a first audio signal output from the electronic device 100 by using an AF. For this, the electronic device 100 may generate an estimated echo signal corresponding to the echo signal of the first audio signal.

In operation S830, the electronic device 100 may determine a double-talk state by using a variance value of an error signal. If the electronic device 100 determines the double-talk state in operation S830, the electronic device 100 may change an updating speed of the AF. For example, the electronic device 100 may enable an echo path estimation of the AF not to be ruined due to the double-talk state by lowering the updating speed. If the double-talk state is not determined in operation S830, the electronic device 100 may maintain the updating speed of the AF and continuously perform an adaptive operation.

In operation S850, the electronic device 100 generates an estimated echo signal by using the variance value of the error signal. An adaptive speed that updates the estimated echo signal may be changed according to whether the double-talk state is determined. In operation S820, the electronic device 100 continuously performs an error signal detection by using the estimated echo signal that is updated and generated.

Figure 9:
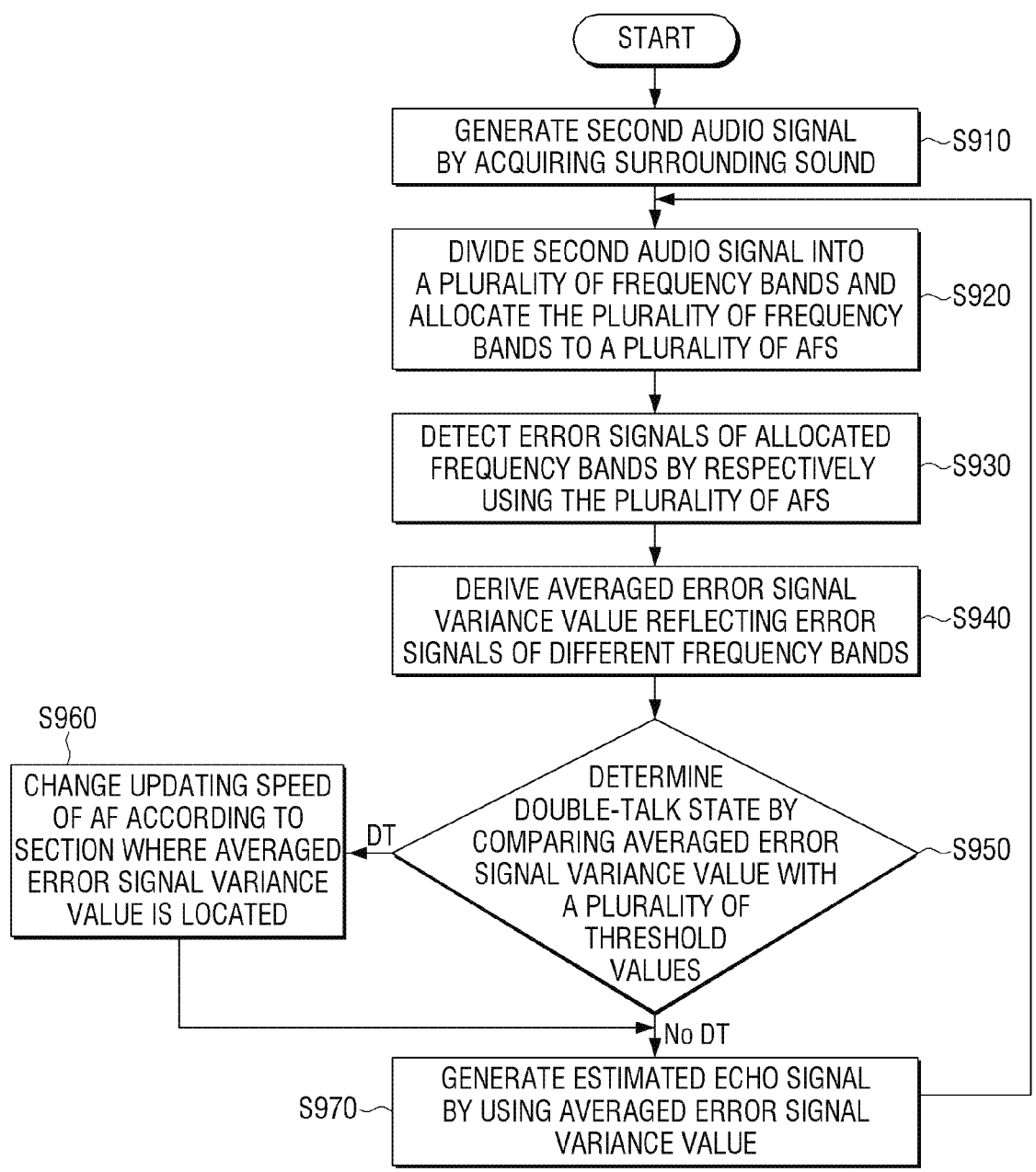

FIG. 9 is a flowchart of a method of cancelling an echo signal of the electronic device 100, according to another exemplary embodiment. Referring to FIG. 9, in operation S910, the electronic device 100 may generate a second audio signal by acquiring a surrounding sound.

In operation S920, the electronic device 100 may divide the second audio signal into a plurality of frequency bands and respectively allocate the divided frequency bands to a plurality of AFs. In operation S930, the plurality of AFs may detect error signals of allocated frequency bands by cancelling an estimated echo signal from an input signal.

In operation S940, the plurality of AFs may derive an averaged error signal variance value by using merely the independently detected error signals and reflecting an error signal detected by an AF operating in a different band together. The plurality of AFs may respectively generate an estimated echo signal of an allocated frequency band by using a variance value of a detected error signal and a variance value of an error signal detected by another AF operating in an adjacent lower frequency band. Also, the plurality of AFs may respectively detect an error signal of a corresponding band by cancelling the generated estimated echo signal from the input signal.

For example, an adjacent lower frequency band does not exist in a case of an AF of a lowest frequency band. In order to reflect an adaptive process of a previous stage, the AF of the lowest frequency band may use a variance value of an error signal detected in a previous stage of another AF operating in a highest frequency band.

In operation S950, the electronic device 100 may determine a double-talk state by comparing the derived averaged error signal variance value with a plurality of threshold values. The electronic device 100 may track and determine a noise floor of an averaged error variance by using the plurality of threshold values. For example, a threshold value of a lowest level may be determined as a multiple of the noise floor, and threshold values of other levels may be determined as multiples of the lowest level.

If the double-talk state is determined in operation S950, the electronic device 100 may determine which one of a plurality of sections the averaged error variance value is located in, by using the plurality of threshold values. In operation S960, the electronic device 100 may change an updating speed of an AF according to the section in which the averaged error variance value is located.

The electronic device 100 may generate estimated echo signals of the plurality of AFs (i.e., of sub-bands) by using the variance value of the averaged error signal. The electronic device 100 may acquire an effect of increasing a robustness to the double-talk state by using an averaged error signal variance reflecting error values of all sub-bands.

Also, the electronic device 100 may continuously perform an adaptive operation by using an updated estimated echo signal.

The above-described methods may be embodied as program instructions that may be executed by processor, integrated circuit, computer, etc. and may be recorded on a computer readable recording medium. The computer readable medium may include program instructions, data files, data structures, or combinations thereof. The program instructions that are recorded on the computer readable recording medium may be particularly designed or configured for the present embodiments or may be known to those skilled in the art and then may be used. Examples of the computer readable recording medium includes magnetic media such as a hard disk, a floppy disk, and a magnetic disk, optical media such as a CD-ROM and a DVD, magneto-optical media such as a floptical disk, and a hardware device that is particularly configured to store and perform program instructions like an ROM, an RAM, a flash memory, or the like. Examples of the program instructions may include machine language codes that are made by a compiler and high-level language codes that may be executed by a computer by using an interpreter or the like. The hardware device may be configured to operate as one or more software modules so as to perform operations, and an opposite case is the same.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a speaker configured to output a sound corresponding to a first audio signal;
a microphone configured to obtain a surrounding sound of the electronic device to generate a second audio signal;
a double-talk detector configured to determine whether a double-talk state, in which an echo signal and a noise signal of the first audio signal are included in the second audio signal, occurs; and
an acoustic echo canceller configured to, in response to the double-talk detector determining that the double-talk state does not occur, generate an estimated echo signal corresponding to the echo signal of the first audio signal based on an adaptive filter and detect an error signal by canceling the generated estimated echo signal from the second audio signal,
wherein the double-talk detector is further configured to, in response to detecting the error signal, determine whether the double-talk state occurs based on a variance value of the error signal, and in response to determining that the double-talk states occurs, change an updating speed of the adaptive filter, and
wherein the adaptive filter comprises a first adaptive filter configured to operate in a first frequency band and a second adaptive filter configured to operate in a second frequency band different from the first frequency band,
wherein the error signal comprises a first error signal in the first frequency band and a second error signal in the second frequency band,
wherein the first adaptive filter is configured to detect the first error signal in the first frequency band, and generate the estimated echo signal in the first frequency band based on a first variance value of the first error signal and a second variance value of the second error signal detected by the second adaptive filter.

2. The electronic device of claim 1, wherein the first frequency band of the first adaptive filter and the second frequency band of the second adaptive filter are adjacent to each other.

3. The electronic device of claim 1, wherein, when the first frequency band is a lowest frequency band, the second frequency band is a highest frequency band.

4. The electronic device of claim 1, wherein the double-talk detector compares the variance value of the error signal with a preset threshold value to determine whether the double-talk state occurs.

5. The electronic device of claim 1, wherein the double-talk detector detects a section in which the variance value of the error signal is located among a plurality of sections divided by a plurality of predetermined threshold values, determine whether the double-talk state occurs based on the section in which the variance value of the error signal is located, and
in response to determining that the double-talk state occurs, changes an updating speed of the adaptive filter into an updating speed corresponding to the section in which the variance value of the error signal is located.

6. A method of cancelling an echo signal of an electronic device, the method comprising:
obtaining a surrounding sound of the electronic device to generate a second audio signal;
determining whether a double-talk state, in which an echo signal and a noise signal of a first audio signal output from the electronic device are included in the second audio signal, occurs;
in response to determining that the double-talk states does not occur, generating an estimated echo signal corresponding to the echo signal of the first audio signal based on an adaptive filter; and
detecting an error signal by cancelling the generated estimated echo signal from the second audio signal,
wherein the determining comprises determining whether the double-talk state occurs based on a variance value of the error signal in response to detecting the error signal and, in response to determining that the double-talk state occurs, changing an updating speed of the adaptive filter, and
wherein the adaptive filter comprises a first adaptive filter configured to operate in a first frequency band and a second adaptive filter configured to operate in a second frequency band different from the first frequency band,
wherein the error signal comprises a first error signal in the first frequency band and a second error signal in the second frequency band,
wherein the detecting the error signal comprises detecting the first error signal and detecting the second error signal, and
wherein the generating the estimated echo signal comprises generating the estimated echo signal in the first frequency band based on a first variance value of the first error signal and a second variance value of the second error signal detected in the second frequency band by the second adaptive filter.

7. The method of claim 6, wherein the first frequency band of the first adaptive filter and the second frequency band of the second adaptive filter are adjacent to each other.

8. The method of claim 6, wherein, when the first frequency band is a lowest frequency band, the second frequency band is a highest frequency band.

9. The method of claim 6, wherein the determining comprises comparing the variance value of the error signal with a preset threshold value to determine whether the double-talk state occurs.

10. The method of claim 6, wherein the determining comprises:
   detecting a section in which the variance value of the error signal is located among a plurality of sections divided by a plurality of predetermined threshold values;
   determining whether the double-talk state occurs based on the section in which the variance value of the error signal is located, and
   in response to determining that the double-talk state occurs, changing an updating speed of the adaptive filter into an updating speed corresponding to the section in which the variance value of the error signal is located.

11. A non-transitory computer readable storage medium storing a program that is executable by a computer to perform a method of cancelling an echo signal of an electronic device, wherein the method comprises:
   obtaining a surrounding sound of the electronic device to generate a second audio signal;
   determining whether a double-talk state, in which an echo signal and a noise signal of a first audio signal output from the electronic device are included in the second audio signal, occurs;
   in response to determining that the double-talk state does not occur, generating an estimated echo signal corresponding to the echo signal of the first audio signal based on an adaptive filter; and
   detecting an error signal by cancelling the generated estimated echo signal from the second audio signal,
   wherein the determining comprises determining whether the double-talk state occurs based on the variance value of the error signal in response to detecting the error signal, and changing an update speed of the adaptive filter in response to determining that the double-talk state occurs, and
   wherein the adaptive filter comprises a first adaptive filter configured to operate in a first frequency band and a second adaptive filter configured to operate in a second frequency band different from the first frequency band,
   wherein the error signal comprises a first error signal in the first frequency band and a second error signal in the second frequency band,
   wherein the detecting the error signal comprises detecting the first error signal and detecting the second signal, and
   wherein the generating the estimated echo signal comprises generating the estimated echo signal in the first frequency band based on a first variance value of the first error signal and a second variance value of the second error signal detected in the second frequency band by the second adaptive filter.

\* \* \* \* \*